United States Patent
Regonini

(10) Patent No.: US 7,900,749 B2
(45) Date of Patent: Mar. 8, 2011

(54) PERFECTED HELICOPTER DRIVE WITH AIR OIL SEPARATOR

(75) Inventor: Roberto Regonini, Somma Lombardo (IT)

(73) Assignee: Agusta S.p.A., Samarate (IT)

( * ) Notice: Subject to any disclaimer, the term of this patent is extended or adjusted under 35 U.S.C. 154(b) by 894 days.

(21) Appl. No.: 11/437,877

(22) Filed: May 22, 2006

(65) Prior Publication Data

US 2007/0000730 A1 Jan. 4, 2007

(30) Foreign Application Priority Data

May 30, 2005 (EP) .................................... 05425390

(51) Int. Cl.
*B01D 45/14* (2006.01)
(52) U.S. Cl. ......................................... 184/6.23; 55/337
(58) Field of Classification Search .............. 184/6.11, 184/6.23, 106; 55/337, 345, 349, 428–429, 55/451, 452, 459.1; 96/188, 189, 216
See application file for complete search history.

(56) References Cited

U.S. PATENT DOCUMENTS

| | | | | |
|---|---|---|---|---|
| 2,575,315 A | * | 11/1951 | Edwards | 123/196 A |
| 2,747,514 A | * | 5/1956 | Edwards | 184/6 |
| 3,016,977 A | * | 1/1962 | Schweitzer et al. | 96/189 |
| 3,653,191 A | * | 4/1972 | Nelson et al. | 55/310 |
| 4,189,310 A | * | 2/1980 | Hotta | 55/317 |
| 4,217,120 A | * | 8/1980 | Reynolds | 55/385.1 |
| 4,714,139 A | * | 12/1987 | Lorenz et al. | 184/6.11 |
| 5,776,229 A | | 7/1998 | Blanes et al. | |
| 6,033,450 A | | 3/2000 | Krul et al. | |
| 6,893,478 B2 | * | 5/2005 | Care et al. | 55/337 |
| 7,063,734 B2 | * | 6/2006 | Latulipe et al. | 96/189 |

FOREIGN PATENT DOCUMENTS

EP 1 344 559 A1 9/2003

\* cited by examiner

*Primary Examiner* — David D Le
*Assistant Examiner* — Terry Chau
(74) *Attorney, Agent, or Firm* — Berenato & White, LLC

(57) ABSTRACT

A drive for a helicopter, has at least one rotary member, a casing housing the rotary member and defining a compartment containing a lubricating fluid and air, and separating device for separating the lubricating fluid from the air and retaining the lubricating fluid inside the casing in the presence of airflow outwards of the casing and produced by pressure gradients between the compartment and the outside. The separating device is angularly integral with the rotary member to centrifugally separate the lubricating fluid from the air radially with respect to the axis.

6 Claims, 2 Drawing Sheets

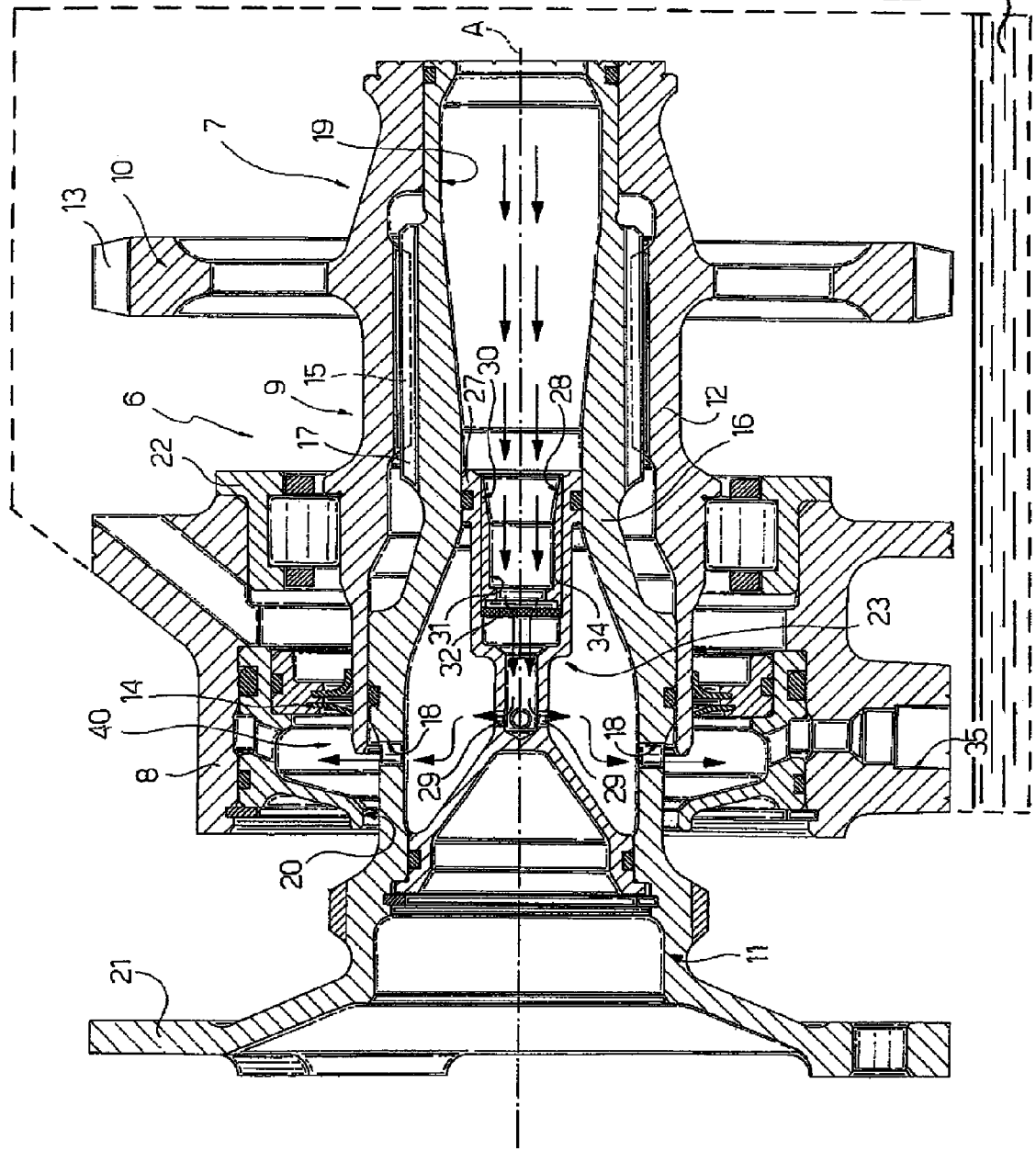

PERFECTED HELICOPTER DRIVE WITH AIR OIL SEPARATOR

The present invention relates to a perfected helicopter drive.

BACKGROUND OF THE INVENTION

As is known, helicopters are normally equipped with a number of drives for transmitting motion from one or more turbines to the main and/or tail rotor, and/or from the turbine to a number of accessory devices, e.g. for powering on-board instruments.

The drives normally comprise a number of gears; and a casing housing the gears and defining a compartment containing air and a lubricating oil bath, which is retained inside the drive by a number of seals fixed to the casing and operating in contact with air.

When the drive is running, the temperature and therefore pressure of the air inside the casing increases; and the increase in air pressure overloads the seals, thus resulting in oil leakage and impaired lubrication.

To reduce the pressure inside the casing in such conditions, relief devices are known to be used comprising a filter permeable to air but not to oil.

Such devices are located along a peripheral edge of the casing, and allow air to escape from the casing to restore the pressure inside the casing to practically atmospheric pressure.

Known relief devices are inefficient alongside high local pressures and particular attitudes of the helicopter, thus resulting in oil leakage and impaired lubrication of the drive.

SUMMARY OF THE INVENTION

It is an object of the present invention to provide a helicopter drive designed to eliminate the aforementioned drawback typically associated with known drives.

According to the present invention, a helicopter drive comprises at least one rotary member (10, 11), a casing (8) housing the rotary member (10, 11) and defining a compartment (9) containing a lubricating fluid and air, a separating device (23) for separating the atomized lubricating fluid from the air, a seal (14) housed in the casing (8) to retain the lubricating fluid inside the compartment (9), and an annular chamber (40) housed inside the casing (8) and defined between the seal (14) and an opening (20) of the compartment (9) located at one end of the casing (8). The separating device (23) is movable angularly about an axis (A) and is angularly integral with the rotary member (10, 11) to centrifugally separate the atomized lubricating fluid from the air radially with respect to the axis (A). The chamber (40) is fluidly connected with said separating device (23) so as to receive, in use, the air separated from the atomized lubricating fluid by said separating device (23). Moreover, the rotary member (10, 11) comprises a tubular body (16) wherein the separating device (23) is rigidly fitted. The tubular body (16) comprises a number of radial holes (18) and houses the separating device (23) comprising a case (27). The case (27) in turn comprises an inlet (28) for a mixture of atomized lubricating fluid and air and defines a number of radial outlets (29) directed towards the holes (18). The case (27) is separate from and housed within the tubular body (16). Furthermore, the case (27) houses a filter (32) arranged in a position interposed axially between the inlet (28) and the outlets (29) and the holes (18), and a sleeve (34) separate from the filter (32) and arranged on the side of the filter (32) axially opposite with respect to the outlets (29). The filter (32) occupies the whole cross section of the case (27) in a plane perpendicular to the axis (A) so as to interfere completely with any flow directed towards the outlets (29) or coming from the outlets (29). The sleeve (34) comprises a peripheral surface (30, 31) defining a return path by which to feed the lubricating fluid, separated from the airflow, back inwards of the compartment (9). In addition, the peripheral surface (30, 31) comprises at least one portion (30) tapering with respect to (A) to facilitate drainage of the lubricating fluid.

BRIEF DESCRIPTION OF THE DRAWINGS

A preferred, non-limiting embodiment of the present invention will be described by way of example with reference to the accompanying drawings, in which:

FIG. 2 shows a larger-scale axial section of the FIG. 1 drive.

DETAILED DESCRIPTION OF THE INVENTION

Figure 1:
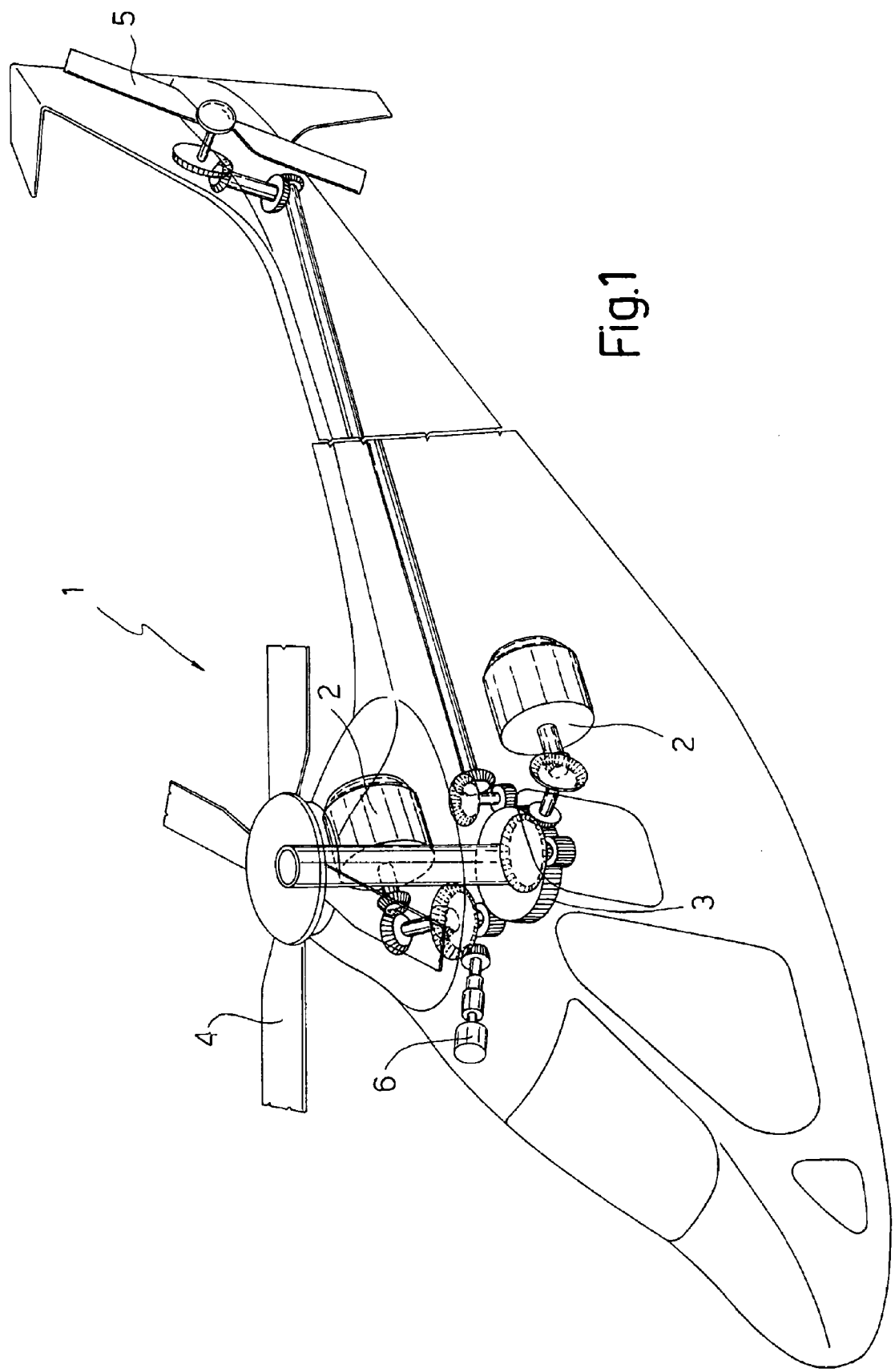
FIG. 1 shows a view in perspective of a helicopter comprising a drive in accordance with the present invention.

Number 1 in FIG. 1 indicates a helicopter comprising two turbines 2; a main rotor 4; a tail rotor 5; and a primary drive 3, only shown schematically, for transmitting motion from turbines 2 to main rotor 4 and tail rotor 5.

Helicopter 1 also comprises a number of secondary drives 6 for transmitting motion from primary drive 3 to respective known accessory devices (not shown), e.g. for powering respective on-board instruments.

In the following description, reference is made to only one drive 6 for the sake of simplicity and purely by way of example.

With reference to FIG. 2, drive 6 comprises a gear train 7 rotating about an axis A and for transmitting motion from primary drive 3 to the respective accessory device; and a casing 8 secured to a fixed structure of helicopter 1 and defining a compartment 9 housing gear train 7.

More specifically, gear train 7 is partly immersed in an oil bath 24, so that compartment 9 contains part oil and part air.

Compartment 9 communicates externally through an axial opening 20 located at one axial end of casing 8.

A seal 14, is positioned about the axis A, and is interposed radially between gear train 7 and casing 8 so as to face the opening 20 in order to retain the lubricating fluid inside the compartment 9 of the casing 8.

Gear train 7 is secured in axially-fixed, rotary manner to casing 8, is housed partly inside casing 8, and projects partly from casing 8 outside opening 20.

More specifically, gear train 7 comprises a gear 10 rotated by drive 3; and a splined gear 11 rotated by gear 10 and connected operatively to the respective accessory device.

More specifically, gear 10 comprises a tubular body 12 secured coaxially and in axially-fixed, rotary manner to casing 8; external teeth 13 connected operatively to drive 3; and internal teeth 15 which mesh with gear 11.

More specifically, body 12 is secured to casing 8 by a number of bearings, of which only one is shown in detail and indicated 22.

Teeth 13 are carried on a portion projecting radially from body 12, and are located on the opposite side of bearing 22 to opening 20.

Gear 11 comprises a tubular body 16 housed partly inside body 12 and projecting partly from body 12 outside opening 20; external teeth 17 meshing with teeth 15 of gear 10; and a radial flange 21 which fits to the respective accessory device.

More specifically, flange 21 is carried by a radially larger portion of body 16, extends outwards with respect to casing 8, and is located on the opposite side of bearing 22 to teeth 13.

Body 16 houses a separator 23, for separating air from oil in the event of airflow caused by pressure gradients between the air inside compartment 9 and the outside air, and comprises a number of radial holes 18 formed in a portion of body 16 inside casing 8 and outside body 12, and which allow air to escape outwards to reduce the pressure in compartment 9 in said condition.

In the presence of said airflow, the air inside compartment 9 is separated from the oil by separator 23, and flows out through holes 18 into an annular chamber 40 defined between seals 14 and opening 20. The air therefore escapes from casing 8 through opening 20 to reduce the air pressure inside compartment 9, thus reducing the risk of damage to seals 14 and consequent oil leakage.

Separator 23 advantageously rotates about axis A to centrifugally separate the oil from the air radially with respect to axis A.

More specifically, separator 23 is fitted rigidly inside body 16, and is designed to prevent air flowing axially out of the open axial end of body 16 at flange 21.

Separator 23 comprises a case 27, of axis A, defining a path for airflow from compartment 9 to holes 18; and an oil-resistant filter 32 permeable to air and housed inside case 27.

Case 27 is hollow and comprises, at the axial end facing away from opening 20 in use, an air and oil inlet 28, and, on the axially opposite side of filter 32 to inlet 28, a number of radial outlets 29 directed towards holes 18 and through which air with substantially no oil flows out into chamber 40. More specifically, case 27 is open axially at the inlet 28 end and closed axially at the opposite end.

Filter 32 is therefore fitted inside case 27 in a position interposed axially between inlet 28 on one side and outlets 29 on the other, and occupies the whole cross section of case 27 in a plane perpendicular to axis A, so as to interfere completely with the oil-entraining airflow.

Case 27, filter 32, and body 16 thus define a cavity 19 inside body 16.

Cavity 19 is bounded axially at one axial end by filter 32, is connected fluidically to compartment 9 at the opposite end to filter 32 in a manner not shown, and therefore contains oil and air at substantially the same pressure as in compartment 9.

When the pressure in compartment 9 is higher than the outside pressure, separator 23 receives a stream of air entraining atomized oil, centrifugally retains the oil separated from the air inside cavity 19, and directs the air to holes 18.

More specifically, a sleeve 34 is fitted inside case 27 in a position interposed axially between inlet 28 and filter 32 to hold filter 32 in position and guide the air and oil between inlet 28 and filter 32.

In axial section, sleeve 34 comprises a truncated-cone-shaped portion 30 close to inlet 28; and a cylindrical portion 31 fixed to case 27 in a position interposed axially between portion 30 and filter 32. Portion 30 and portion 31 collect the oil separated from the air by filter 32 and spun onto the wall of sleeve 34 facing axis A.

More specifically, portion 30 diverges with respect to axis A towards inlet 28 of case 27 to withdraw the oil from separator 23 while still keeping it inside cavity 19. Portion 31 has different radial dimensions to decelerate the oil-rich radially outer regions and accelerate the oil-poor radially inner regions of the fluid flowing towards filter 32.

Case 27 is fixed at its axial ends to body 16, and is preferably formed in one piece to avoid using separate component parts requiring precise angular connection to prevent abnormal rotation.

Drive 6 also comprises a drain conduit 35, shown only partly, for draining any oil droplets escaping separator 23 into a sump not shown in the accompanying drawings.

More specifically, drain conduit 35, shown only partly, originates radially from chamber 40.

Finally, as shown in FIG. 2, chamber 40 is bounded axially by a radial constriction at the portion of opening 20 extending radially between body 16 and the lateral edge of opening 20. The purpose of the constriction is to assist in drawing and collecting inside chamber 40 any oil droplets escaping filter 32.

In actual use, secondary drive 6 is operated to transmit motion via gear train 7 from drive 3 to the respective accessory device.

Operation of gear train 7 heats, and so increases the pressure of, the air inside compartment 9, and also rotates gears 10 and 11 about axis A to rotate the air and oil inside cavity 19 connected fluidically to compartment 9.

The pressure gradient between the air inside compartment 9 and the air outside drive 6 produces an air stream, which guides the oil into case 27 of separator 23 through inlet 28.

Inside case 27, the air and oil flow helically with a component of motion parallel to axis A, caused by the pressure gradient, and a component of motion rotating about axis A, caused by rotation of separator 23 integral with gear 11.

The component of motion parallel to axis A causes the air and oil to interact with filter 32, which lets the air through and retains the oil inside cavity 19.

The component of motion rotating about axis A causes the oil separated from the air by filter 32 to collect on the inner wall of sleeve 34.

By virtue of the pressure gradient, the air then flows out of separator 23 through outlets 29, out of gear 11 through holes 18, into chamber 40, and then to the outside. Conversely, by virtue of the shape of portion 31, the oil collected on the inner wall of sleeve 34 moves, in the opposite direction to the airflow, inwards of cavity 19 and away from separator 23.

After a given transient period, the airflow from compartment 9 to the outside balances the air pressure inside compartment 9 and the outside air pressure, thus preventing overloading of seals 14.

Any oil droplets escaping separator 23, and drawn out of body 16 by the pressure gradient together with the air, are collected in chamber 40 and drained into the sump by drain conduit 35.

When the outside air pressure is higher than the air pressure in cavity 19 and compartment 9, airflow is generated from the outside into cavity 19.

In which case, the airflow path is the opposite of that described when pressure is higher in cavity 19 than outside, and filter 32 prevents any particulate in the air from reaching cavity 19 and so polluting the oil.

The advantages of drive 6 according to the present invention will be clear from the foregoing description.

In particular, separator 23 provides for effectively separating oil from the incoming. air from cavity 19 and compartment 9 in the presence of particularly high air pressures and in numerous attitudes of helicopter 1.

The risk of damage to seals 14 and poor lubrication is therefore greatly reduced.

Clearly, changes may be made to drive 6 as described and illustrated herein without, however, departing from the protective scope defined in the accompanying Claims.

In particular, case 27 may be defined by two separate, angularly connected members, each fixed inside cavity 19.

The invention claimed is:

1. A drive (6) for a helicopter (1), comprising:
   - at least one rotary member (10, 11);
   - a casing (8) housing said rotary member (10, 11) and defining a compartment (9) containing a lubricating fluid in an oil bath and air;
   - a separating device (23) for separating said lubricating fluid from a mixture of atomized lubricating fluid and said air and retaining said lubricating fluid inside said casing (8) in the presence of airflow outwards of said casing (8) and produced by pressure gradients between said compartment (9) and the outside;
   - a seal (14) housed into said casing (8) between said at least one rotary member (10, 11) and said casing (8) to retain said lubricating fluid inside said compartment(9); and
   - an annular chamber (40) housed inside said casing (8) and defined between said seal (14) and an opening (20) of said compartment (9) located at one end of said casing (8);
   - said separating device (23) being movable angularly about an axis (A) and angularly integral with said rotary member (10, 11) to centrifugally separate said lubricating fluid from said air radially with respect to said axis (A);
   - said chamber (40) being fluidly connected with said separating device (23) so as to receive, in use, said air separated from said lubricating fluid by said separating device (23);
   - said rotary member (10, 11) comprising a tubular body (16) wherein said separating device (23) being fitted rigidly inside said tubular body (16);
   - said tubular body (16) comprising a number of radial holes (18) and housing said separating device (23) comprising a case (27);
   - said case (27) comprising an inlet (28) receiving said mixture of said atomized lubricating fluid and said air and defining a number of radial outlets (29) directed towards said radial holes (18) fluidly connected to said chamber (40);
   - said case (27) being separate from and housed within said tubular body (16);
   - said case (27) housing a filter (32) arranged in a position interposed axially between said inlet (28) and said outlets (29), and a sleeve (34) separate from said filter (32) and arranged on the side of said filter (32) axially opposite with respect to said outlets (29);
   - said filter (32) occupying the whole cross section of said case (27) in a plane perpendicular to said axis (A) so as to interfere completely with any flow directed towards said outlets (29) or coming from said outlets (29);
   - said sleeve (34) comprising a peripheral surface (30, 31) defining a return path by which to feed said lubricating fluid, separated from said airflow, back inwards of said compartment (9);
   - said peripheral surface (30, 31) comprising at least one portion (30) tapering with respect to said axis (A) to facilitate drainage of said lubricating fluid.

2. The drive as claimed in claim 1, wherein said rotary member (10, 11) and said separating device (23) are mounted coaxially with each other.

3. The drive as claimed in claim 2, wherein said separating device (23) is housed inside said rotary member (10, 11).

4. The drive as claimed in claim 1, further comprising a drain conduit (35) originating radially from the chamber (40) and adapted to drain any oil droplets escaping separating device(23).

5. The drive as claimed in claim 1, wherein said case (27) is radially interposed between said tubular body (16) on one side and said filter (32) and said sleeve (34) on the other side.

6. The drive as claimed in claim 1, wherein sleeve (34) is separate from both said filter (32) and said case (27).

* * * * *